(12) United States Patent
Ollivier

(10) Patent No.: US 6,363,959 B1
(45) Date of Patent: *Apr. 2, 2002

(54) FLUID PRESSURE REGULATOR WITH DIFFERENTIAL PRESSURE SETTING CONTROL

(75) Inventor: Louis A. Ollivier, Palo Alto, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/553,161

(22) Filed: Apr. 19, 2000

Related U.S. Application Data

(60) Provisional application No. 60/133,295, filed on May 10, 1999.

(51) Int. Cl.$^7$ ................................................ G05D 16/02
(52) U.S. Cl. ................ 137/14; 137/505.14; 137/505.39
(58) Field of Search ............................. 137/14, 505.14, 137/505.39

(56) References Cited

U.S. PATENT DOCUMENTS

| | | |
|---|---|---|
| 975,838 A | 11/1910 | Deady |
| 1,620,322 A | 3/1927 | Browne |
| 2,545,787 A | 3/1951 | Leach |
| 3,279,495 A | 10/1966 | Taylor |
| 4,066,091 A | 1/1978 | Itoh et al. |
| 4,257,450 A | 3/1981 | Ollivier |
| 4,702,277 A | 10/1987 | Ollivier |
| 4,744,387 A | 5/1988 | Otteman |
| 4,828,219 A | 5/1989 | Ohmi et al. |
| 5,072,749 A | * 12/1991 | Ligh ....................... 137/116.5 |
| 5,230,359 A | 7/1993 | Ollivier |
| 5,458,001 A | 10/1995 | Ollivier |
| 5,732,736 A | 3/1998 | Ollivier |
| 5,755,428 A | 5/1998 | Ollivier |
| 5,762,086 A | 6/1998 | Ollivier |
| 5,787,925 A | 8/1998 | Ollivier |

FOREIGN PATENT DOCUMENTS

| | | |
|---|---|---|
| FR | 2 578 918 | 9/1986 |
| JP | 8-2735 | 1/1996 |

OTHER PUBLICATIONS

Literature of Fluorocarbon Teflon Pressure Regulator printed 1978.

Literature of Veriflo Corporation Super Q High Performance Point–of–Use Regulators for High Technology Application.

Literature of Veriflo Corporation SQ Micro Miniature Pressure Regulator. (Rev. No. 3, 4/97).

Literature of Veriflo Corporation SQ 420E High Purity Point–of–Use Regulator. (Rev. 2, 2/98).

Literature of Veriflo Corporation SQ 140E High Purity Point–of–Use Regulator. (Rev. 3, 4/98).

Literature of Veriflo Corporation SQ 60 High Performance Point–of–Use Regulator.

* cited by examiner

Primary Examiner—Stephen M. Hepperle
(74) Attorney, Agent, or Firm—John A. Molnar, Jr.

(57) ABSTRACT

A fluid pressure regulator and method of operating the same particularly adapted for use in alternating flow and no flow modes as in the batchwise delivery of pressurized gases used in semiconductor manufacture. Such pressure regulator and method include a controlled differential pressure setting capability which provides for the application of a differential pressure setting force independently of a main pressure setting force. As a result, operation of the pressure regulator may be controlled to obviate pressure creep at the regulator outlet.

14 Claims, 5 Drawing Sheets

FLUID PRESSURE REGULATOR WITH DIFFERENTIAL PRESSURE SETTING CONTROL

RELATED CASES

The present application claims priority to U.S. Provisional Application Ser. No. 60/133,295, filed May 10, 1999.

BACKGROUND OF THE INVENTION

The present invention relates broadly to fluid pressure regulators and methods of operating the same, and more particularly to a pressure regulator having a controlled differential pressure setting capability providing improved response when utilized, for example, in batchwise gas delivery applications such as may be found in the semiconductor processing industry.

Fluid pressure regulators are used in a variety of fluid transfer applications involving the delivery or other transport of pressurized process gases or the like. Within these applications, pressure regulators are provided to deliver a flow of a pressurized gas or other fluid at a regulated outlet pressure, and to maintain that pressure at a set value generally independent of the gas flow rate. For that purpose, the pressure regulator is supplied at its inlet port by a source of fluid which typically is at a pressure substantially higher than the desired outlet pressure. The desired outlet pressure is set and the regulator automatically actuates an internal valve to adjusts the size of a variable passage between its inlet and outlet ports to minimize the offset between the actual outlet pressure and the set pressure.

As is detailed more fully in commonly-assigned U.S. Pat. Nos. 5,787,925; 5,762,086; 5,755,428; 5,732,736; 5,458,001; 5,230,359; 4,702,277; and 4,257,450, pressure regulators of the type herein involved conventionally are operated on a force balance principle. In this regard, an internal diaphragm assembly of the regulator is subjected to forces acting in opposite directions. These forces include a first force acting in a first direction and related to the pressure setting, typically developed by the manual compression of a coil or other spring, a second force acting in a second direction opposite the first direction and developed by the outlet pressure as applied to the effective area of the diaphragm exposed to that pressure. Under standard operating conditions, the first force of the pressure setting is held constant such that any variation in the inlet or outlet pressure effects a proportional change in the second, opposing force being applied to the diaphragm. The imbalance thereby created between these opposing first and second forces cause the diaphragm to deflect. This deflection is transmitted directly to the valve which cooperates with an associated valve seat to vary the open area of an orifice or other fluid passage defined between the valve and the seat and, as a result, the fluid flow from the inlet of the regulator to its outlet.

For example, a step change increase in outlet flow rate generally will tend to decrease the outlet pressure and, proportionally, the second, opposing force being applied to the diaphragm by the outlet pressure. The force imbalance thereby developed is translated to the valve element via the deflection of the diaphragm. Such deflection urges the valve element to move in a direction which increases the area of the fluid flow orifice defined between the element and its associated valve seat. This increase, in turn, effects a corresponding increase in the fluid flow rate through the regulator which ultimately balances at steady state condition wherein the decrease in the outlet pressure is modulated.

Conversely, for a step change decrease in the outlet flow rate, the flow imbalance thereby developed would have the effect of urging the valve element in an opposite direction to decrease the area of its fluid flow orifice and, proportionately, the flow rate. A new balance thus is effected in which the outlet pressure is marginally increased as compared to outlet flow prior to the step change decrease.

The above-described automatic operation illustrates that some change in outlet pressure is required to accommodate a change in outlet flow. The purpose of pressure regulation therefore is to minimize the change in outlet pressure for a given range of flow variation. In addition to outlet pressure, the response of a pressure regulator must accommodate the effect of inlet pressure changes on the regulated outlet pressure, and also the effect as the flow rate approaches zero. The latter is expressed as the ability of the pressure regulator to close under a no-flow condition.

Regarding the effects of inlet pressure changes, the inlet pressure applied to the area of the valve passage develops a force which, as aforementioned, acts in the opposite direction as that of the pressure setting force. For example, a decrease in inlet pressure results in a proportionate decrease in the force transmitted to the diaphragm assembly, with the force balance being restored by a corresponding increase in outlet pressure. Sequentially, the decrease in inlet pressure decreases the force opposing the pressure setting force which, in turn, causes the diaphragm assembly to increase the valve opening. With the flow across the valve thereby being increased, the outlet pressure is increased to a new value which again restores the force balance. As conventionally operated at inlet pressures of 30–500 psi, pressure regulators of the type herein involved typically exhibit about a 1 psi increase or, as the case may be, decrease in outlet pressure for each 100 psi change in inlet pressure.

The precise relationship between inlet pressure decrease and outlet pressure increase is determined by the ratio of the effective areas of the valve passage and the diaphragm. For a more detailed analysis of this effect, reference may be had to the present inventor's prior U.S. Pat. No. 5,230,359, entitled "Supply Pressure Compensated Fluid Pressure Regulator And Method."

Particularly for applications involving the batchwise delivery of a process gas at the point of use, there has been an expressed interest in providing for a fast start-up at the beginning of each delivery cycle. Such a start-up may be achieved when the outlet pressure of the regulator is controlled to stabilize quickly at a steady-state value as the gas flow is increased from no flow prior to the commencement of a delivery cycle, to a given delivery flow rate.

The semiconductor industry, for example, utilizes the batchwise delivery of process gases in the manufacture of integrated circuit (IC) chips or dies. In the general mass production of semiconductor devices, hundreds of identical "integrated" circuit (IC) trace patterns are photolithographically imaged over several layers on a single semiconductor wafer which, in turn, is cut into hundreds of identical dies or chips. Within each of the die layers, the circuit traces are deposited from a metallizing process gas such as tungsten hexafluoride ($WF_6$), and are isolated from the next layer by an insulating material deposited from another process gas. The process gases typically are delivered in discrete flow cycles or "batches" from pressurized supplies, thereby requiring delivery systems of a type which may be operated in alternate flow and no-flow modes.

A representative delivery system of such type is shown at 10 in the schematic of FIG. 1. Referring then to FIG. 1, delivery system 10 may be seen to conventionally include, in series, a gas supply 12, a pneumatic isolation valve, 14, a pressure regulator, 16, a pressure transducer, 18, a manual valve, 20, a mass flow controller, 22, and a pneumatic on/off valve, 24. Fluid flow through system 10 is in the direction reference by arrow 30.

Prior to the initiation of a delivery cycle, system 10 is in a start-up/stand-by or "no-flow" operational mode wherein pneumatic valve 24 is commanded closed, manual valve 20 is set open, and mass flow controller 22 is set to zero. At the initiation of "flow" or delivery operational mode, pneumatic valve 24 is commanded to open and the mass flow controller 22 is set to control flow at a desired rate. Thereupon, at the termination of the flow mode, the pneumatic valve 24 is commanded closed and the setting of the mass flow controller 22 is returned to zero. At all times during both operational modes, the pressure regulator 16 remains set at a desired regulated pressure with supply or inlet pressure being provided to the inlet 32 of the regulator and with outlet or delivery pressure being provided from the outlet 34 of the regulator to mass flow controller 22.

Indeed, within fluid systems such as system 10, there is a particular need to maintain a generally constant gas pressure notwithstanding the gas flow rate demand which varies between the operational modes of the system from low or no flow to a relatively high flow. In this regard, the flow regulating devices employed in these systems, such as mass flow controller 22, generally are highly accurate if a stable gas pressure can be maintained at the inlet of the device. However, the large pressure drops associated with changes in the flow demands of the delivery system often make it difficult to maintain a stable gas pressure and, accordingly, to assure the accuracy of the flow regulating device. Ultimately, the defect rate and yield of the process may be deleteriously affected.

Moreover, it has been observed in connection with the conventional operation of system 10 that the outlet pressure of regulator 22 begins to decrease as soon as flow is initiated in the delivery mode, and continues to decreases until it reaches a value corresponding to the setting of the regulator. The pressure decrease comprises two components, namely, a "creep" component and a "droop" component. The effect of each of these components may be appreciated with reference to FIG. 2 wherein a flow curve for a representative pressure regulator of the type herein involved is plotted at 40 as a function of outlet pressure ($P_o$) versus the log of flow rate (R) for a given inlet pressure. As the flow rate increases from about 50 to 1,0000 cc/min in the direction referenced by arrow 42, the droop component is expressed as a pressure drop which is proportional to the flow rate. The creep component, in turn, is expressed as a pressure drop as the flow rate increases from zero to a small value of about 20–50 cc/min or, alternatively, as a pressure increase in the direction referenced by arrow 44 as the flow is decreased from 20–50 cc/min to zero.

The "creep" of a pressure regulator therefore is defined as its ability to maintain a constant outlet pressure as the flow is decreased from a small value to a no-flow condition. In this regard, the internal valve of any pressure regulator cannot, as a result of cold flow or other deformation of the seating materials, make an absolutely fluid-tight seal in the zero flow condition. The outlet pressure of the regulator therefore is observed to increase slowly over time. The rate of increase is generally non-linear and decreases over time, i.e., it may take 30 seconds for the outlet pressure to increase by 1 psi, 3 minutes to increase by 2 psi and 30 minutes to increase by 3 psi.

The effect of creep upon the operation of a fluid system, such as system 10 of FIG. 1, is to increase the response time of the system to reach steady-state flow as the outlet pressure must decrease from a higher, creep-induced no-flow value, to a lower, operating or setpoint value determined by the regulator setting. The time necessary for the outlet pressure to reach the setpoint value of the regulator is a function of the flow rate and fluid volume between the regulator 16 and the mass flow controller 22. For example, a decrease of 2 psi, i.e., from 17 psi to a standard operating pressure of 15 psi, may require about 0.3 sec for a typical fluid volume of 8 cc and a flow rate of 200 cc/min. However, at lower flow rates, i.e., 20–50 cc/min, the response time may become significant, i.e., 1–3 sec, and even may be considered unacceptable as a response of less than 1 sec generally is desired.

A separate, but similarly important consideration is the manner in which the outlet pressure approaches a steady-state condition in response to a step change in flow rate. That is, if the outlet pressure response is not linear, but rather is oscillatory with some overshoot and recovery, it may not be possible to establish a steady state flow to the mass flow controller within the desired 1 sec interval. In this regard, the operation of mass flow controllers is known to be adversely affected by a pressure reversal as may be caused by a pressure overshoot. The greater the outlet pressure decrease from the creep-induced no-flow valve to the operating setpoint increases the potential for a pressure overshoot.

In view of the foregoing, it will be appreciated that further improvements in the design of pressure regulators for process gas delivery and other bath processes would be particularly well-received by the semiconductor manufacturing industry. Especially desired would be a regulator which provides a rapid response with no pressure overshoot from a no-flow to a flow condition of the fluid circuit, and thus economizes the use of process gases for higher yields per batch.

SUMMARY OF THE INVENTION

The present invention is directed broadly to a fluid pressure regulator construction and method of operating the same. More particularly, the invention is directed to a diaphragm-type regulator construction and method affording a controlled differential pressure setting capability providing improved response when utilized, for example, in fluid systems for the batchwise delivery of pressurized gases as may be found in the semiconductor processing industry, as well as in other applications having flow and no-flow operational modes. Such capability allows for a differential pressure setting force to be applied to the diaphragm of the regulator independently of the main pressure setting force. As a result, the regulator of the present invention may be operated in a manner which obviates or at least minimizes the effect of creep on the outlet pressure for a more rapid approach to steady-flow without pressure overshoot or other system de-stabilizing hysteresis effects.

In accordance with the precepts of the present invention, the regulator thereof is operated within a fluid system in a conventional manner except that the outlet pressure setting is determined by both a main pressure setting force, which may be manually adjustable, and an separate, differential force, which may be controlled pneumatically or by another pressure signal. In this regard, the main pressure setting force is adjusted such that the outlet flow is regulated at an outlet pressure which is incrementally less than the outlet pressure specified for the mass flow controller or other flow component of the fluid system. At about the start of the operation of the system in a flow mode, the differential force is applied to the diaphragm in the same direction as the main pressure setting force so that the fluid flow is regulated in the flow mode of the system at an outlet pressure which is about the specified outlet pressure. Thereafter, the application of the differential force is terminated at about the end of the operation of the system in the flow mode, i.e., the beginning of the no-flow mode. In this way, an ersatz creep effect is mimicked such that, over time, the outlet pressure is maintained in the no flow mode of the system at a value which is about equal to, or only marginally greater than, the specified value. Accordingly, upon the differential force being re-applied and system flow being initiated, steady-state operation may be rapidly approached with only a marginal "droop" decrease in outlet pressure as the flow rate is increased and, as a result, substantially no pressure overshoot. Therefore, when utilized, for example, in the manufacture of semiconductors, the regulator and method of the present invention economizes the use of process gases for higher yields per batch.

In a preferred embodiment, the regulator of the present invention is provided to be responsive to a pneumatic or other pressure signal to apply the differential force. In this regard, the regulator includes a separate compressible spring member, which may be a spring coil, coupled in force transmitting communication with the diaphragm. For compressing the coil to apply the differential force on the diaphragm, a piston member is received within said regulator as operably coupled to the compressible member. The piston member is displaceable responsive to the pressure signal along a longitudinal axis of the regulator from a normally-biased first position to a second position effecting the compression of the compressible member to apply the differential force on the diaphragm. Advantageously, the signal may be controlled to be supplied to both the regulator and a pneumatic valve of the fluid system such that the application of the differential force is initiated at the same time as the flow mode of the system.

The present invention, accordingly, comprises the apparatus and method possessing the construction, combination of elements, and arrangement of parts and steps which are exemplified in the detailed disclosure to follow. Advantages of the invention includes a pressure regulator and method for operating the same which minimizes pressure creep when utilized in fluid systems operated in alternate flow and no-flow modes for faster pressure response and steady-state operation. Additional advantages include a regulator construction which is generally robust and economical to manufacture, and which eliminates the need for multiple stages, electronic controls, or additional valves and components heretofore necessary for more stable operation. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
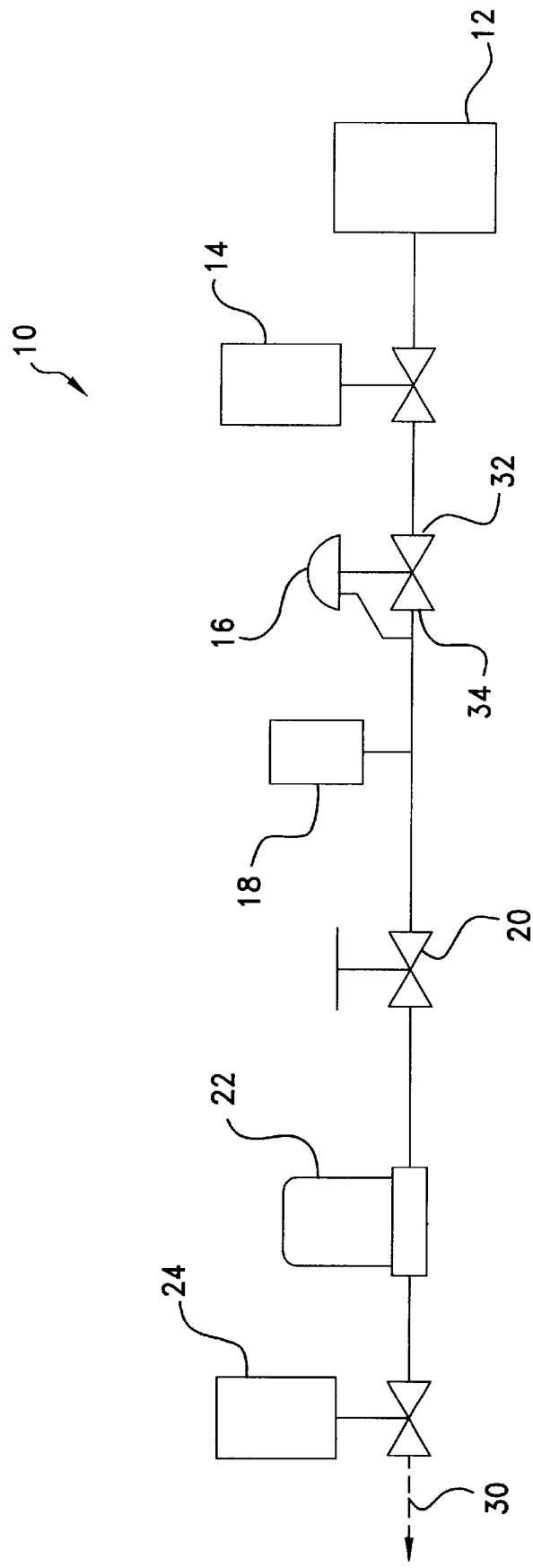
FIG. 1 is schematic diagram of an representative fluid circuit as may be used in conjunction with the present invention for delivering a regulated, batchwise flow of a pressurized process gas from a supply to a semiconductor manufacturing tool.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, the terms "radial" and "axial" referring, respectively, to directions or planes perpendicular and parallel to the longitudinal central axis of the referenced element, and the terms "downstream" and "upstream" referring, respectively, to locations relative to the fluid flow. Terminology of similar import other than the words specifically mentioned above likewise is to be considered as being used for purposes of convenience rather than in any limiting sense.

For the purposes of the discourse to follow, the precepts of the pressure regulator, and the controlled differential pressure setting operation thereof, of the invention herein involved are described in connection with the utilization of such regulator within a fluid system, such as the delivery circuit shown in FIG. 1, wherein a pressurized gas is delivered batchwise from a supply. It will be appreciated, however, that aspects of the present invention may find application in other fluid systems operable in alternating flow and no-flow modes. Use within those such other applications therefore should be considered to be expressly within the scope of the present invention.

Figure 3:
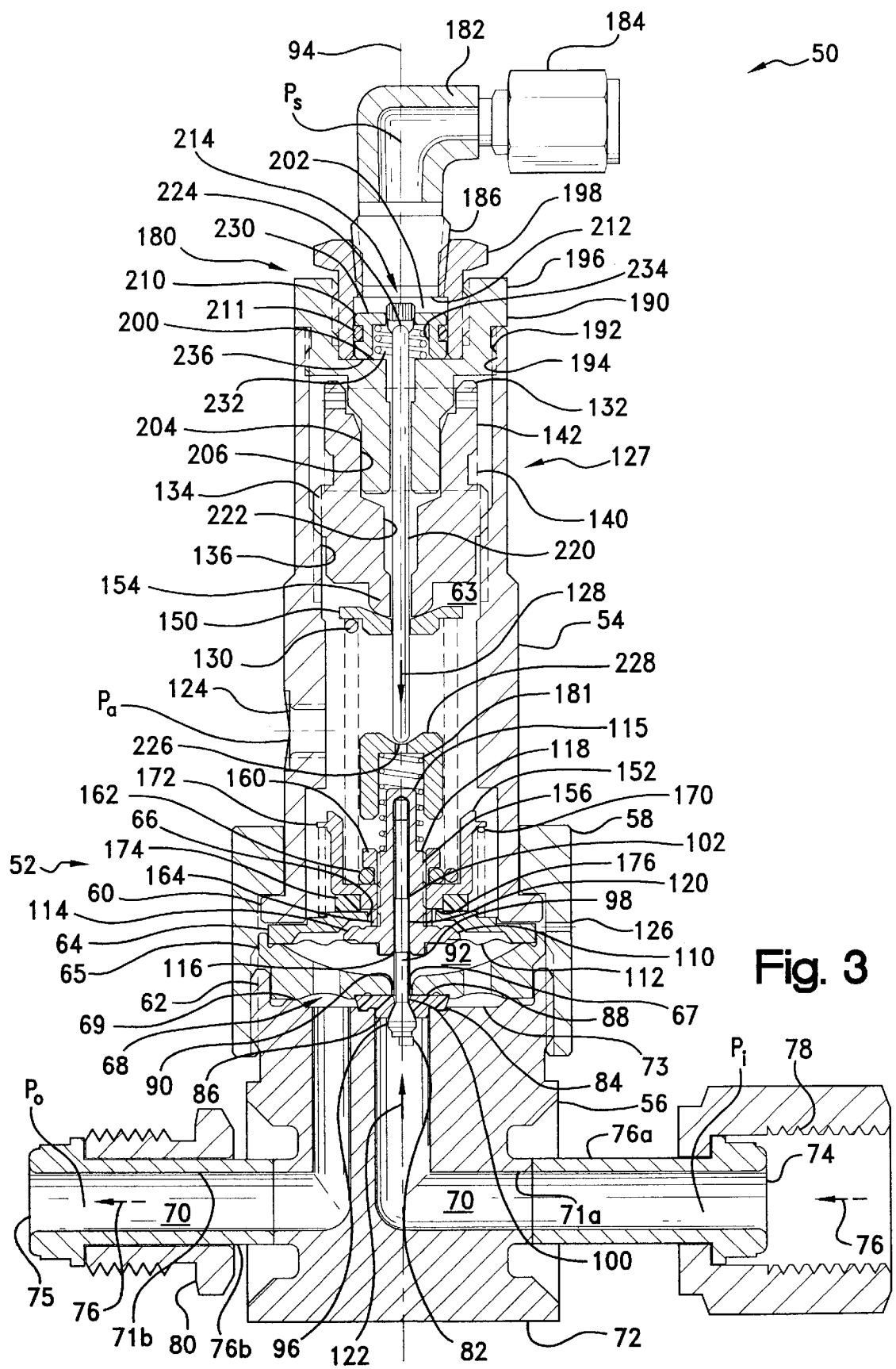
FIG. 3 is a cross-sectional view of an representative embodiment of a diaphragm-type pressure regulator according to the present invention including a manually adjustable main pressure setting assembly and a pneumatically-controllable differential pressure setting assembly which is actuable to apply a differential force on the regulator diaphragm independent of the main pressure setting force.

Referring then to the cross-sectional view of FIG. 3, wherein corresponding reference numbers are used to designate corresponding elements throughout the several views, a fluid pressure regulator in accordance with the present invention is shown generally at 50. In basic construction, regulator 50 includes a housing, referenced at 52, which may comprise a generally annular, upper cap portion, 54, and a lower body portion, 56. A associated nut, 58, may be received over a flanged lower end, 60, of the cap 54 for a threaded connection with an externally-threaded upper end, 62, of body 56. Cap and body portions 54 and 56 thereby may be engaged to define an internal chamber, 63, within housing 52. Upper and lower support plates, 64 and 65, respectively, are clamped between the cap and body portions 54 and 56 for supporting other regulator components. Each of plates 64 and 65 are formed as having a central opening, 66 and 67, respectively. Plate 65 further is formed as having a plurality of axially-extending through bores or channels, one of which is referenced at 68, and is made to compressively engage a raised annular surface, 69, of body 56 to effect a back-up seal against leakage of the gas or other fluid flowing through the regulator 50.

Body portion 56 of housing 52 itself is formed as having an internal fluid passageway, 70, which may be divided into generally L-shaped upstream and downstream portions 71a and 71b, each extending from an axial surface, 72, of body 56, to an upper radial surface, 73, thereof. Fluid passageway 70 itself extends between an inlet, 74, and an outlet, 75, of the regulator for the flow of fluid therethrough in the direction referenced by arrows 76. Within the fluid circuit 10 of FIG. 1, a high pressure flow of gas is supplied to regulator inlet 74 from supply 12, and a regulated, lower pressure flow is delivered to mass flow controller 22 from regulator outlet 75. In this regard, regulator inlet 74 may be coupled in fluid communication with supply 12 via valve 14, with outlet 75 being coupled in fluid communication with mass flow controller 22 via valve 20. Each of inlet 74 and outlet 75 accordingly may be configured, as is shown, as flanged tubing extensions, 76a–b, respectively, which may be brazed or otherwise joined to body portion 56. For connection within the fluid 10, extension 76a is shown as having an associated female fitting connector, 78, with extension 76b being shown as having an associated male connector, 80.

For controlling the flow of fluid through passageway 70, chamber 63 houses a valving assembly including a poppet, 82, and an associated valve seat, 84, defined within passageway 70 such as by a disc which is supported over the upstream portion 71a of passageway 70 and clamped between the central opening 67 of lower support plate 65 and the opening of passageway portion 71a into the upper radial surface 73 body portion 56. Valve seat 84, is oriented relative to the flow direction 76 as having an upstream side, 86 and a downstream side, 88, and includes an aperture, 90, for admitting fluid pressure into a lower plenum, 92, of chamber 63, which plenum is defined partially by lower support plate 65. Flow out of plenum 92 and into the downstream portion 71b of passageway 70 is accommodated via plate channels 69. The disc for valve seat disc 84 preferably is formed of a plastic or other polymeric material, and most preferably of a fluoropolymer such as Kel-F® (3M, St. Paul., Minn.).

Poppet 82 is movable along a central longitudinal axis, 94, of the regulator 50 between a first position (shown in FIG. 3) closing passageway 70 to fluid flow for the operation of fluid system 10 (FIG. 1) in its no-flow mode, and a variable second position throttling the fluid flow through passageway 70 for the operation of system 10 in its flow mode. For cooperation with valve seat 84, poppet 82 is provided to extend along axis 94 from a lower head portion, 96, disposed opposite the upstream side 86 of valve seat 84, to an upper, elongate stem portion, 98, which, in turn, extends through aperture 90 and lower plate opening 67 along axis 94 from a lower proximal end, 100, connected to head portion 96, to an upper distal end, 102. Poppet head portion 96 is configured, such as the general conic shape shown, to annularly vary the relative size of aperture 90 and, accordingly, the flow rate through the regulator, when moved toward or away from valve seat 84 in the variable second poppet position.

For controlling the movement of poppet 82 along axis 94, a diaphragm, 110, is received within chamber 63 as disposed in fluid communication with passageway 70 to define a flexible upper wall of plenum 92, and as coupled in force transmitting contact with poppet 82. Diaphragm 110 is of a conventional single or multiple piece construction, and includes a circumferentially extending, generally flexible "membrane" portion, 112, which may be formed of a thin, corrugated sheet of aluminum, steel, or other metal foil. Membrane portion 112 extends radially outwardly to an outer margin which defines the outer periphery of the diaphragm 110, and which is clamped between upper and lower plates 64 and 65 for the mounting of diaphragm 110 within chamber 63. In a two-piece construction of diaphragm 110, membrane portion 112 is welded, bonded, or otherwise attached to a backup portion, 114, which supports the membrane portion 112, and which extends axially therefrom through the opening 66 of plate 64 in defining a cylindrical extension, 115, including an internal central passage, 116, and an external shoulder, 118. Passage 116 is configured to receive the distal end 102 of poppet stem 98, and may be internally threaded for engagement with an externally threaded portion, 120, of stem 98. So received in chamber 63, diaphragm 110 is provided to be responsive to a fluid pressure force, which is proportional to the inlet pressure ($P_i$) and outlet fluid pressure ($P_o$) of the fluid flow to regulator 50 and is applied in the direction referenced at 122 to urge poppet 82 toward its first position closing passageway 70 to fluid flow. Atmospheric pressure ($P_a$) is admitted in chamber 63 on the upper side of diaphragm 110 via ports 124 and 126 formed, respectively, through cap 54 and nut 58.

Figure 4:
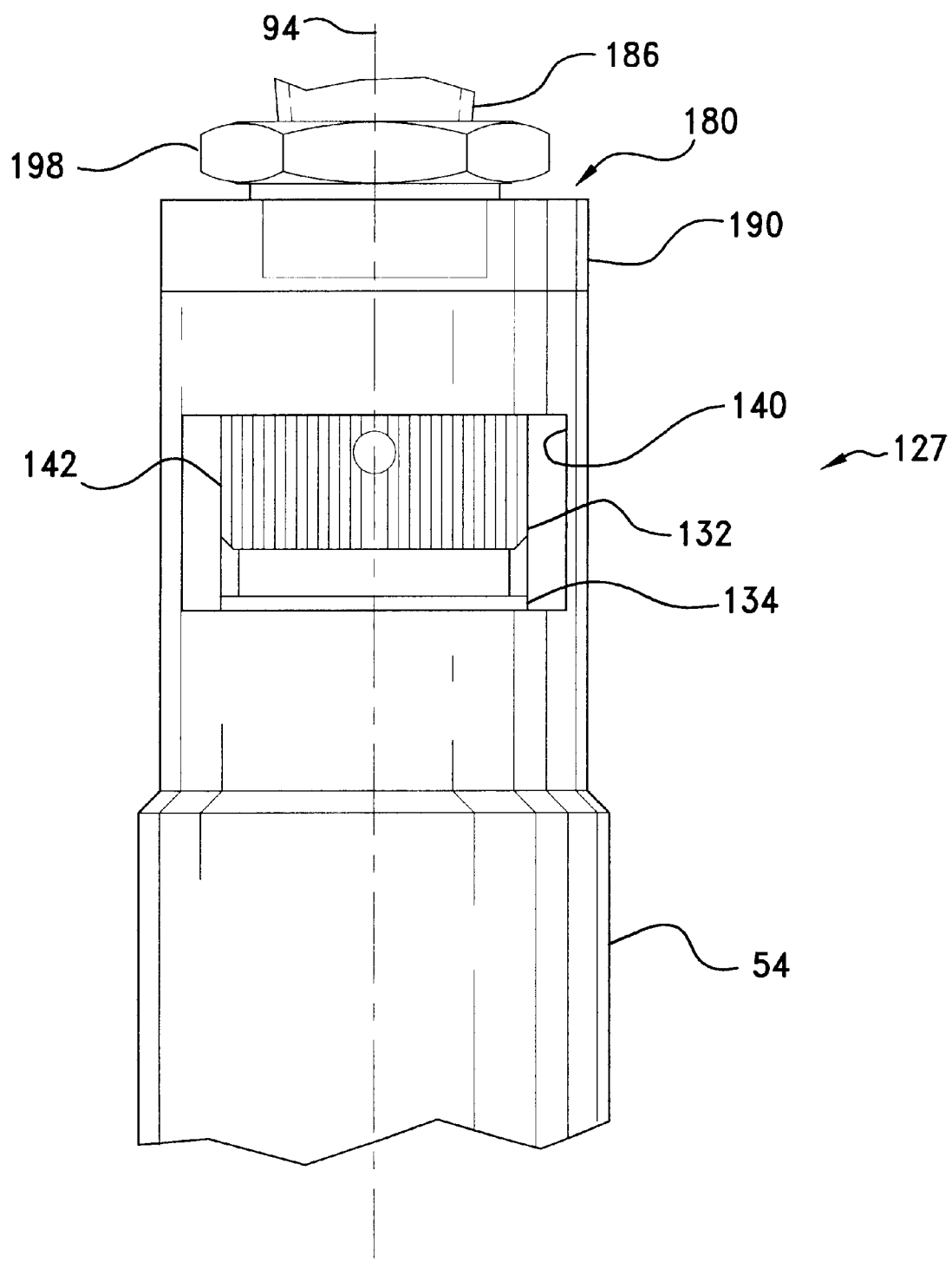
FIG. 4 is a magnified view of the regulator of FIG. 3 showing the manual main pressure setting adjustment thereof in enhanced detail.

A main pressure setting assembly, reference generally at 127, is actuable to applying a balancing force on diaphragm 110 in the direction referenced at 128 for opposing the fluid pressure force 122 and urging poppet 82 toward its second position opening passageway 70 to fluid flow. Such force 128 is developed at least in part by the adjustable compression of a main coil spring, shown in phantom at 130, or other resilient member received within chamber 63. In the illustrated embodiment of FIG. 3, spring 130 is disposed coaxially with axis 94 for compression intermediate diaphragm 110 and a manually-adjustable knob, 132, which is translatable along axis 94. For a compact design of regulator 50, knob 132 is externally-threaded as at 134, and is housed within cap 54 as threadably rotatably engaged with an internally threaded portion, 136, thereof. As may be seen best with momentary reference to the magnified frontal view of main pressure setting assembly 127 shown in FIG. 4, cap 54 is provided as having a window, 140 (also shown in phantom in FIG. 3), through which a knurled portion, 142, of knob 132 is provided to be hand accessible.

Returning to the cross-sectional view of FIG. 3, spring 130 may be seen to be received within chamber 63 as disposed intermediate an upper retainer, 150, and a lower retainer, 152. Upper spring retainer 150 is generally disc-shaped, and is disposed in abutting, force-transmitting contact with a thrust portion, 154, of knob 132. Lower spring retainer 152 is generally cylindrically-shaped, and is received coaxially over diaphragm back-up extension 115 as threadably engaged in force transmitting contact with an externally-threaded portion, 156, thereof. Retainer 152 is fastened onto extension 115 with a nut, 160, which may have an associated O-ring, 162, over which the lower end of spring 130 may be friction fit for assisting the coaxial alignment of the spring with axis 94. A compression ring, 164, or other spacer may be received with retainer 162 over extension 115 for delimiting the travel of the retainer over the extension.

For applying an additional force on diaphragm 110 in the direction of arrow 122, a wave spring or other compressible member, shown in phantom at 170, is received coaxially over retainer 162. Spring 170 is supported on upper support plate 64 for compression therebetween and a radially-outwardly extending flange portion, 172, of retainer 152. Such compression of spring 170 provides a biasing force for further urging poppet 82 toward its first position such that fluid passageway 70 is normally closed in the absence of a pressure setting force 128. The movement of poppet 82 between its first and second positions may be damped with a compressible foam washer, 174, which is received coaxially over diaphragm extension 115 for compression intermediate retainer 152 and plate 64. The displacement of poppet 82 in its second position by the application of pressure setting force 128 is delimited by the abutting engagement of a lower stop surface, 176, of retainer 152 with plate 64.

Regulator 50 further includes a differential pressure setting assembly, referenced generally at 180. In accordance with the precepts of the present invention, differential pressure setting assembly 180 is provided to be actuable independently of the main pressure setting assembly 127 to apply a differential force, such as via the compression of a second coil spring member, 181, on diaphragm 110 in the direction of arrow 128 further urging poppet 82 toward a second position opening passageway 70 to fluid flow. In the illustrated embodiment of FIG. 3, differential pressure setting assembly 180 is actuable responsive to a pneumatic on/off control signal of a given input pressure ($P_s$) which, preferably, may be between about 40–60 psig to be at the same level which is conventionally employed in operating the pneumatic valves 14 and 24 of fluid system 10 of FIG. 1. The signal to assembly 180, as well as valves 14 and 24 of system 10, may be provided under the common control of, for example, of a pneumatic 3-way valve (not shown).

The pressure control signal may be admitted to regulator 50 via a tubing or other fitting connection, 182, having, for example, a female end, 184, configured for a tubing or other connection to the above mentioned 3-way valve or other control signal source, and a male end, 186, configured for a threaded connection with an adapter, 190, of regulator housing 52. Adapter 190, in turn, has a male end, 192, configured for a threaded connection with an internally threaded upper end, 194, of cap 54, and a female end, 196, which, depending upon the sizing of fitting end 186, may be coupled thereto via a bushing or other reducer, 198. The female end 196 of adapter 190 further is configured as having a recess which extends to internal end wall, 200, that defines a second chamber, 202, within housing 52. The adapter male end 192 further is configured as having an elongate guide portion, 204, which is fitted within a generally cylindrical counter bore, 206, of knob 132 to assist in guiding the knob along axis 94.

For controlling the compression of second spring member 181, a piston, 210, having an associated O-ring or other seal or packing ring, 211, is received within chamber 202 as displaceable intermediate lower end wall 200 and an upper end wall, 212, of chamber 202. Upper end wall 212 is defined, such as by a radially-inwardly extending internal shoulder portion of reducer 198, about a common opening, 214, of adapter 190 and reducer 198, which opening 214 functions as a port the admission of the signal fluid pressure into chamber 202.

Piston 210 is operably coupled to spring 181 via an elongate force transmitting member, 220. Such member 220 extends along axis 94, as received coaxially through a central bore, 222, formed through each of adapter 190, knob 132, and spring retainer 150, from an upper end, 224, disposed in abutting contact with piston 220, to a lower end, 226, disposed in abutting contact with spring 181. Spring 181 itself is disposed coaxially within main pressure setting spring 130 as mounted over diaphragm extension 115 for compression between the shoulder portion 118 thereof, and an inverted U-shaped retainer, 228, interposed between spring 181 and the lower end 226 of elongate member 220.

Within chamber 202, piston 210 is actuable responsive to the control pressure signal as admitted through opening 214 and applied to an upper surface, 230, of the piston. That is, piston 210 is displaceable along axis 94 from a normally-biased upper position to the lower position shown in FIG. 3. For biasing piston in its upper position, a compressible spring coil, 232, may be received within a recess, 234, formed within a lower surface, 236, of the piston for compression against adapter lower end wall 200. In its lower position, piston 210 depresses elongate member 220 which, in turn, effects the compression of spring 181 to apply a differential force, which may be between about 3–4 psig, on diaphragm 110. In this way, a controlled application of the differential force may be achieved independent of the application of the main pressure setting force.

The force applied by spring 181 is "differential" in that it may be applied as a step function to effect a proportionate change in the regulator outlet pressure without changing the main pressure setting. For example, with the main pressure setting 127 of regulator 50 being adjusted within a range of between about 0–30 psi, differential pressure setting assembly 180 is actuable by the control signal to increase the effective regulator setting by a nominal 3 psi. If desired, the pressure of the control signal may be adjusted to effect a generally proportional increase or decrease in the differential force.

Figure 2:
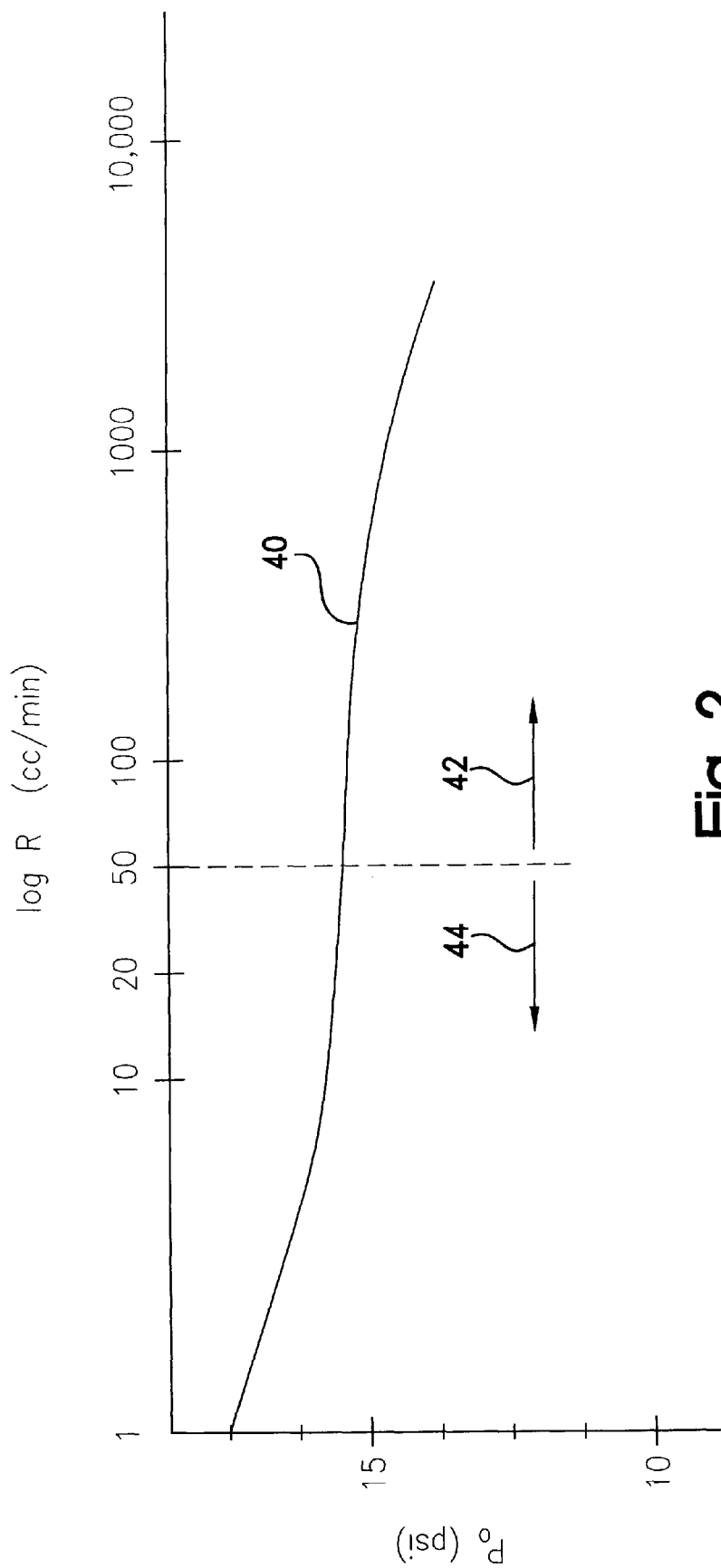
FIG. 2 is a typical flow curve at a given inlet or supply pressure for a diaphragm-type pressure regulator, the curve being shown as a logarithmic plot of the regulator outlet or delivery pressure versus flow rate.
Figure 5:
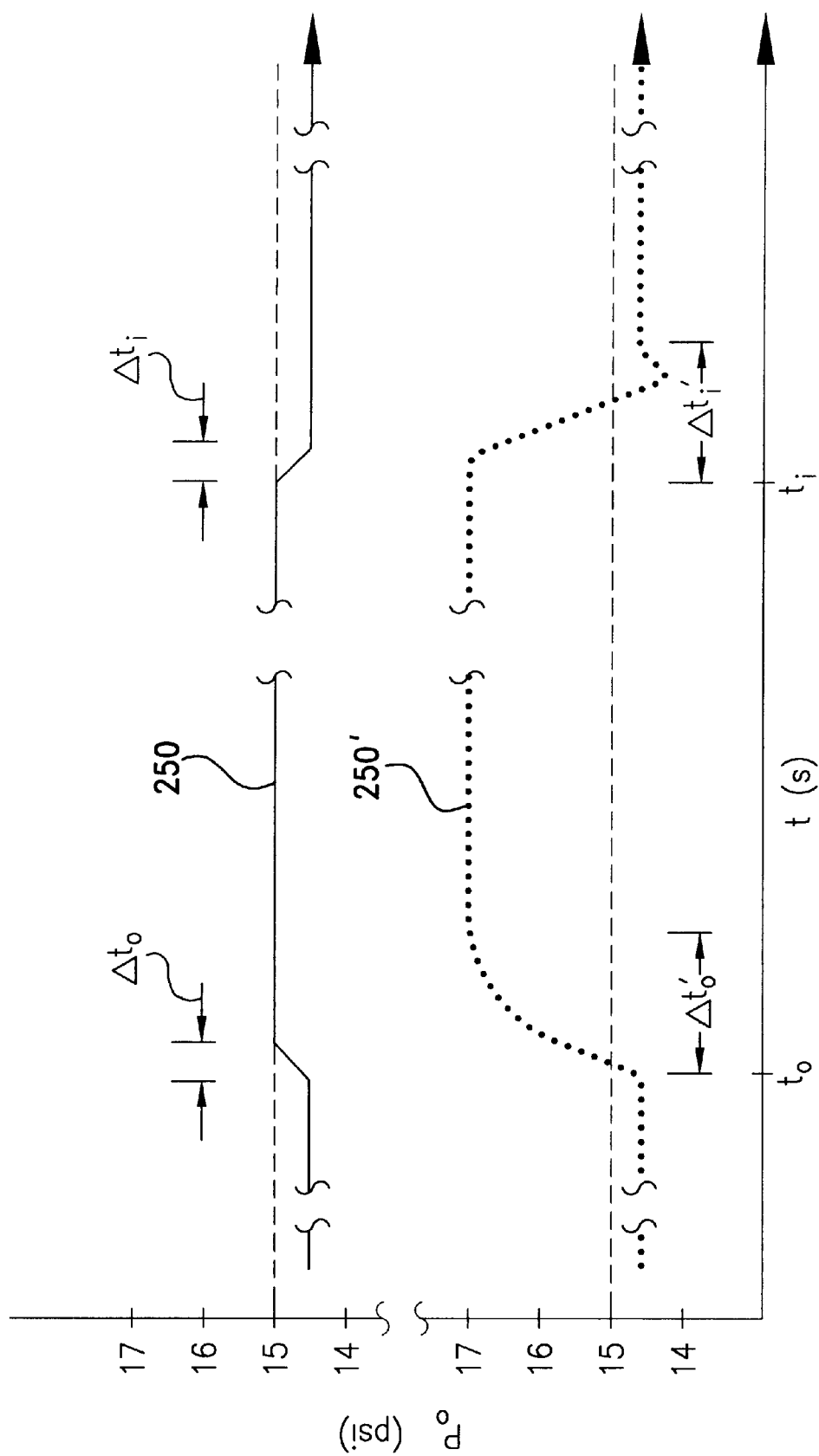
FIG. 5 is a representative pressure response of a regulator operated according to the present invention with a controlled differential pressure setting, the response being shown as the regulator outlet pressure traced as a cyclic function of time and as compared to the response of a regulator which is conventionally operated at a constant pressure setting.

Considering next the operation of regulator 50 of the invention as employed in a representative fluid circuit such as batchwise gas delivery circuit 10 of FIG. 1 (with regulator 50 of the invention being substituted therein for regulator 16), reference may be had additionally to FIG. 5 wherein a typical response of regulator 50 within such circuit is graphically portrayed at 250 as a plot of outlet pressure ($P_o$) versus time (t). For a given inlet fluid pressure, which may be between about 30–500 psi, and a specified outlet pressure setpoint of about 15 psi, the system is operated prior to time $t_0$ in a flow mode. In such mode, gas is delivered through regulator 50 at a steady-state flow rate of, for example, 200 cc/min, and a regulated outlet pressure of about 14.8 psi. Such pressure is effected under the control of the main pressure setting of the regulator 50 which is adjusted to a nominal pressure of 12 psi, and with signal pressure being supplied to the regulator to apply a differential pressure which is nominally 3 psi. Both the main and the differential pressure settings may be set at a lower flow rate of, for example, 50 scc/min. In this regard, it may be noted that the actual regulator outlet pressure at steady flow is about 0.2 psi less than the setpoint due to the effect of "droop" (see FIG. 2) as the flow rate is increased from low flow to its steady-state value.

At about time $t_0$, corresponding to the termination of the flow mode, the mass flow controller 22 (FIG. 1) is commanded "off." Shortly thereafter, i.e., 0.5 sec or less, pneumatic on/off valve 24 is actuated to close such that fluid flow decreases from the steady-state rate to zero. Generally simultaneously with the actuation of valve 24, signal pressure is discontinued to regulator 50 to remove the differential pressure setting. In this regard, the operation of valve 24 and regulator 50 advantageously may be synchronized under the control of a common signal pressure.

With the differential pressure setting being removed, the setting of regulator 50 effectively is reduced to 12 psi. Inasmuch as the outlet pressure remains at the operating pressure of 14.8 psi, the regulator closes such that the outlet pressure is maintained substantially at 14.8 psi. Depending upon the length of the no-flow period and/or on the interval, typically about 0.5 sec, between when the no flow mode is initiated and when the control pressure signal is removed to effect the closing of the regulator, the outlet pressure may increase slightly, to perhaps 15 psi, over the period $\Delta t_0$. It will be appreciated, however, that by virtue of the controlled differential pressure setting, no appreciable creep effect is evident even when the system is operated with very long intervals, i.e., 1 hour or more, between the flow modes.

Continuing then along trace 250, at time $t_1$, corresponding to the initiation of the next flow mode, the pressure signal is resumed to open valve 24 and to re-apply the differential force on the regulator. Shortly thereafter, the mass flow controller 22 is commanded to again control flow. In such operation, flow may be increased from zero to a steady-state value before any appreciable increase in the outlet pressure as a result of creep induced from the effective change in the regulator setting from 12 psi to 15 psi. Thus, as the flow rate increases, the outlet pressure decreases only about 0.2 psi to settle quickly at the operating pressure within a very short period $\Delta t_1$, of about 0.5 sec or less. Importantly, as no overshoot or other oscillatory effects are observed, the transition from zero to steady-state flow is able to be established within 1 sec or less.

For purposes of comparison, the pressure trace of a regulator conventionally operated at a constant pressure setting of 15 psi is shown at 250'. At time $t_0$ and continuing over the period $\Delta t_0'$ which may be 100 sec or more, the outlet pressure of trace 250' may be noticed to increase by about 2 psi from the operating pressure. As compared to the 0.2 psi increase for valve 50 of the invention, such increase is significant, as is the period $\Delta t_1'$ which may be 1.5 sec or more with some overshoot or other oscillatory effects being evident.

Thus, a unique and efficient fluid pressure regulator construction and method of operation are described which mitigate the effect of pressure creep and which, when employed in fluid systems operated in alternate flow and no-flow modes, allow faster pressure response and steady-state operation for improved process gas utilization or other system economy.

Unless otherwise specified, materials of construction are to be considered conventional for the uses involved. Such materials generally will be corrosion resistant and otherwise selected for compatibility with the fluid being transferred or for desired mechanical properties.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A fluid pressure regulator for use within a fluid system including a source of a pressurized fluid, said regulator having an inlet couplable in fluid communication with said source and an outlet, and said system being operable in a flow mode wherein a flow of said pressurized fluid is to be supplied from the outlet of said regulator at a specified outlet pressure and, alternately, in a no-flow mode, said regulator comprising:

a fluid passageway defined between the inlet and an outlet of said regulator for the flow of said fluid therethrough;

a valve assembly having a poppet movable along a longitudinal axis of said regulator between a first position closing said fluid passageway to the flow of said fluid for the operation of said system in said no-flow mode, and a variable second position throttling the flow of said fluid through said passageway for the operation of said system in said flow mode;

a diaphragm coupled in force transmitting communication with said poppet and disposed in fluid communication with said fluid passageway such that a fluid pressure force of said fluid is applied thereto, said fluid pressure being applied on said diaphragm in a first direction urging said valve element toward said first position;

an adjustable main pressure setting assembly for applying a select outlet pressure setting force on said diaphragm in a second direction opposite said first direction urging said valve element toward a said second position; and a differential pressure setting assembly actuable to apply a differential force on said diaphragm in said second direction further urging said valve element toward said second position, said differential force being applied to said diaphragm independent of said outlet pressure setting force, whereby said diaphragm is responsive to a net summation of the fluid pressure, outlet pressure setting, and differential forces to balance said poppet in said first or said second position, and whereby with said main pressure setting assembly being adjusted to regulate the flow of fluid from said regulator at an outlet pressure which is less than said specified outlet pressure, said differential pressure setting assembly is actuable at about the start of the operation of said system in said flow mode to apply said differential force on said diaphragm such that the flow of said fluid from said regulator is regulated at an outlet pressure which is about said specified outlet pressure, and wherein said differential pressure setting assembly is de-actuable at about the start of the operation of said system in said no-flow mode to terminate the application of said differential force on said diaphragm.

2. A fluid pressure regulator for use within a fluid system including a source of a pressurized fluid, said regulator having an inlet couplable in fluid communication with said source and an outlet, and said system being operable in a flow mode wherein a flow of said pressurized fluid is to be supplied from the outlet of said regulator at a specified outlet pressure and, alternately, in a no-flow mode, said regulator comprising:

a fluid passageway defined between the inlet and an outlet of said regulator for the flow of said fluid therethrough;

a valve assembly having a poppet movable along a longitudinal axis of said regulator between a first position closing said fluid passageway to the flow of said fluid for the operation of said system in said no-flow mode, and a variable second position throttling the flow of said fluid through said passageway for the operation of said system in said flow mode;

a diaphragm coupled in force transmitting communication with said poppet and disposed in fluid communication with said fluid passageway such that a fluid pressure force of said fluid is applied thereto, said fluid pressure being applied on said diaphragm in a first direction urging said valve element toward said first position;

an adjustable main pressure setting assembly for applying a select outlet pressure setting force on said diaphragm in a second direction opposite said first direction urging said valve element toward a said second position, said main pressure setting assembly comprising:
   a manually adjustable knob rotatably displaceable along said longitudinal axis; and
   a compressible member configured as a first spring member interposed between said knob and said diaphragm assembly, said compressible member being compressed by the displacement of said knob along said longitudinal axis to apply a said select outlet pressure setting force on said diaphragm assembly;
a differential pressure setting assembly actuable by a pneumatic control signal of a given input pressure to apply a differential force on said diaphragm in said second direction further urging said valve element toward said second position, said differential force being applied to said diaphragm independent of said outlet pressure setting force; and
a housing comprising:
   a lower body within which said fluid passageway is formed; and
   and an upper cap having a top end, a bottom end coupled to said body, an opening formed intermediate said top and bottom ends, and a signal port to admit said control signal,
said knob being threadably received within said cap to be manually accessible through said opening, and
said differential pressure setting assembly comprising:
   a second spring member disposed coaxially within said first spring member and coupled in force transmitting communication with said diaphragm assembly;
   a piston member received within said cap intermediate said signal port and said knob and operably coupled to said compressible member, said piston member being displaceable responsive to said control signal along said longitudinal axis from a normally-biased position to a displaced position effecting the compression of said compressible member to apply a said differential force on said diaphragm assembly; and
   an elongate force transmitting member extending along said longitudinal axis coaxially through said knob and said first spring member from a first end engaging said piston member to a second end engaging said second spring member for compressive contact therewith responsive to the displacement of said piston member,
   whereby said diaphragm is responsive to a net summation of the fluid pressure, outlet pressure setting, and differential forces to balance said poppet in said first or said second position.

3. The regulator of claim 1 wherein said differential pressure setting assembly is actuable by a pneumatic control signal of a given input pressure, and wherein said differential pressure setting assembly includes:
   a compressible member coupled in force transmitting communication with said diaphragm; and
   a piston member received within said regulator and operably coupled to said compressible member, said piston member being displaceable responsive to said control signal along said longitudinal axis from a normally-biased position to a displaced position effecting the compression of said compressible member to apply a said differential force on said diaphragm.

4. The regulator of claim 1 further comprising a biasing member for applying a biasing force on said diaphragm in said first direction further urging said valve element toward said first position, and wherein said diaphragm further is responsive to said biasing force to be balanced in said first or said second position.

5. The regulator of claim 1 wherein said main pressure setting assembly for applying a select outlet pressure setting force on said diaphragm includes:
   a manually adjustable knob rotatably displaceable along said longitudinal axis; and
   a compressible member interposed between said knob and said diaphragm assembly, said compressible member being compressed by the displacement of said knob along said longitudinal axis to apply a said select outlet pressure setting force on said diaphragm assembly.

6. The regulator of claim 5 further comprising a housing including:
   a lower body within which said fluid passageway is formed; and
   and an upper cap having a top end, a bottom end coupled to said body, and an opening formed intermediate said top and bottom ends,
   said knob being threadably received within said cap to be manually accessible through said opening.

7. The regulator of claim 2 wherein:
   said valve assembly includes a valve seat defined within said passageway, said valve seat having an aperture for admitting said fluid pressure to said diaphragm assembly and being oriented relative to the direction of the flow of said fluid as having an upstream side and a downstream side,
   said poppet being formed as having a lower head portion disposed opposite the upstream side of said aperture and configured to vary the relative size of said aperture when moved along said longitudinal axis toward and away from said aperture, and as having an upper stem portion extending through said aperture into force transmitting contact with said diaphragm assembly.

8. The regulator of claim 7 wherein said diaphragm is formed as having an internal central passage into which said poppet stem portion is received and an external shoulder portion supporting said second spring member for the compression thereof by said piston force transmitting member.

9. In a fluid system including a source of a pressurized fluid, a method of controlling a regulator having an inlet coupled in fluid communication with said source and an outlet, said system being operable in a flow mode wherein a flow of said fluid is to be supplied from the outlet of said regulator at a specified outlet pressure, and said regulator being of a variety including a valve element which is actuable to close said regulator to the flow of said fluid and, alternately, to throttle the flow of said fluid through said regulator, said valve element being actuated by a diaphragm coupled in force transmitting communication therewith and disposed in fluid communication with said fluid to be responsive to a fluid pressure force thereof, and said regulator further including an adjustable main pressure setting assembly for applying a select pressure setting force on said diaphragm, said method comprising the steps of:
   (a) adjusting the main pressure setting assembly of said regulator such that the flow of said fluid therefrom is regulated at an outlet pressure which is less than said specified outlet pressure;
   (b) applying at about the start of the operation of said system in said flow mode a differential force on said diaphragm independent of said pressure setting force such that the flow of said fluid therefrom in said flow mode is regulated at an outlet pressure which is about said specified outlet pressure; and (c) terminating the application of said differential force at about the end of the operation of said system in said flow mode.

10. The method of claim 9 comprising the additional step:

(d) returning to step (b) of the method.

11. The method of claim 9 wherein said differential force is applied in step (b) responsive to a pneumatic control signal.

12. The method of claim 11 wherein:

said system further includes a pneumatic valve which is actuable by a pneumatic control signal to effect the operation of said system in said flow mode, and said differential force is applied in step (b) responsive to said pneumatic control pressure signal supplied to said regulator.

13. In a fluid circuit including a source of a pressurized fluid, a pressure regulator having an inlet coupled in fluid communication with said source and an outlet, and a pneumatic valve responsive to a pneumatic control signal for admitting a flow of said pressurized fluid through said circuit, a method of operating said circuit for the batchwise delivery of the flow of said fluid from said regulator at a specified outlet pressure, said regulator being of a variety including a valve element which is actuable to close said regulator to the flow of said fluid and, alternately, to throttle the flow of said fluid through said regulator, said valve element being actuated by a diaphragm coupled in force transmitting communication therewith and disposed in fluid communication with said fluid to be responsive to a fluid pressure force thereof, and said regulator further including an adjustable main pressure setting assembly for applying a select pressure setting force on said diaphragm, said method comprising the steps of:

(a) adjusting the main pressure setting assembly of said regulator such that the flow of said fluid therefrom is regulated at an outlet pressure which is less than said specified outlet pressure;

(b) supplying said pneumatic control signal to said pneumatic valve and said regulator to admit a flow of said pressurized fluid through said circuit, said regulator being provided to be responsive to said control signal to apply a differential force on said diaphragm independent of said pressure setting force such that the flow of said fluid therefrom is regulated at an outlet pressure which is about said specified outlet pressure; and (c) terminating the supply of said signal of step (b) to said pneumatic valve and said regulator to discontinue the flow of said pressurized fluid through said circuit and the application of said differential force on said diaphragm.

14. The method of claim 13 comprising the additional step:

(d) returning to step (b) of the method.

* * * * *